United States Patent [19]

Lees

[11] 4,016,132

[45] Apr. 5, 1977

[54] COLOURATION OF POLYOLEFINE ARTICLES

[75] Inventor: Gerard Lees, Harrogate, England

[73] Assignee: Imperial Chemical Industries Limited, London, England

[22] Filed: Nov. 17, 1975

[21] Appl. No.: 632,661

Related U.S. Application Data

[63] Continuation-in-part of Ser. No. 403,852, Oct. 5, 1973, abandoned.

[30] Foreign Application Priority Data

Oct. 9, 1972 United Kingdom ............ 46406/72

[52] U.S. Cl. ............................ 260/40 R; 260/40 P
[51] Int. Cl.$^2$ ......................................... C08K 9/10
[58] Field of Search ...................... 260/40 R, 40 P

[56] References Cited

UNITED STATES PATENTS

| ,607,335 | 9/1971 | Belde | 106/288 Q |
| 3,694,402 | 9/1972 | Essam | 260/40 |

*Primary Examiner*—James H. Derrington
*Attorney, Agent, or Firm*—Cushman, Darby & Cushman

[57] ABSTRACT

A process for the production of a coloured shaped article from an olefine polymer, wherein from 5 to 20% of a polyester by weight of said olefine polymer and from 0.01 to 2% by weight of said olefine polymer of a dyestuff soluble therein are separately or together mixed with or incorporated into the polyolefine prior to shaping, and said polyolefine is shaped.

16 Claims, No Drawings

COLOURATION OF POLYOLEFINE ARTICLES

This invention relates to the colouration of polyolefine shaped articles and is a continuation-in-part of my copending application Ser. No. 403,852, filed Oct. 5, 1973, now abandoned.

It is well known that polyolefine articles have a very low affinity for most dyestuffs and that dyestuffs, as for example water insoluble dyestuffs having long hydrocarbon chains in the molecule, for which polyolefines do have an affinity are of very poor fastness to washing, rubbing, light and other influences met with during use of the articles. Many proposals have been made to improve both the affinity of a polyolefine article for dyestuffs and to improve the fastness of the coloured article. Most of these proposals include the addition of a substance having a good affinity for dyestuffs to the olefine polymer, shaping the article from the polyolefine/additive mixture and then conventional dyeing of the article in an aqueous dyebath. Such methods have never achieved full commercial success for one reason or another, as for example poor yield of colour in or low fastness of the dyed article or deposition of material on the surfaces of moving parts of machinery handling the articles.

It has also been suggested that colouration may be achieved by mixing a finely divided pigment powder with a finely-divided powder of the olefin polymer before melting and shaping of the mixture. This method also has a number of disadvantages in that a batch of pigment/polymer mixture must be separately prepared for each shaping run and for each colour and the shaping apparatus must be dismantled and thoroughly cleaned before a differently-coloured article can be produced. In addition the pigments used, which must be insoluble in the polyolefine if a good fastness of colour is to be achieved, give only dull colours in a limited range of shades.

We have now found that polyolefine articles may be effectively and lastingly coloured prior to shaping of the article by a process wherein the disadvantages of the prior methods are overcome, the step of conventional dyeing is dispensed with and a wider range of brighter colours may be imparted to polyolefine articles.

According to the present invention we provide a process for the production of a coloured shaped article from an olefine polymer, wherein a minor proportion of a polyester and a dyestuff soluble therein are separately or together mixed with or incorporated into the polyolefine prior to shaping.

The present invention is particularly adapted to the production of coloured articles which are shaped by a continuous process, as for example filaments or films which are shaped by melt spinning into very long lengths, or extrusion-coated articles which are also produced in a continuous manner by extrusion application of a fluid polymer to a substrate material.

A process according to this invention may be used to produce coloured articles of any extrudable polyolefine. The term polyolefine is used herein to include polymers of both unsaturated hydrocarbons and unsaturated halogenated hydrocarbons as for example linear polyethylene, polyvinylchloride and stereoregular polypropylene or poly-4-methylpentene-1. Polyolefines of the latter type contain asymmetric carbon atoms in their repeat units and accordingly are susceptible to the formation of free radicals under the influence of light or heat. These radicals lead to pronounced degradation of the polyolefine chains and to decomposition of susceptible substances included in a polyolefine article. It is one important benefit of the present invention that at least one class of susceptible substances, the colouring materials, are protected from the adverse effects of free radicals and that the articles produced are of much improved colour fastness.

A polyester for use in process according to this invention may be a homopolyester or a copolyester which is fusible at the shaping temperature, and the term polyester is used herein to include both classes of polymer. Exemplary of suitable polyesters are poly(ethylene terephthalate) homopolymer and copolymers of ethylene terephthalate with other diols or dibasic acids wherein the ethylene terephthalate units are the predominating units in the copolymer chains. It is preferred that the polyester should be one having a glass to rubber transition temperature (Tg) of at least 60° C.

By the term dyestuff as used herein is meant an organic colouring matter which is soluble in both the polyolefine and the polyester to some extent but is of higher solubility in the polyester. Particularly useful classes of dyestuffs are those of the anthraquinone and azo chemical types listed in the Colour Index as Disperse and Solvent dyestuffs. Such dyestuffs are insoluble or of low solubility in water and for use in this invention should preferably be free of materials other than the dye itself as for example the inorganic diluents commonly added to commercial dyestuffs for the purpose of standardisation. Particular dyestuffs in the disperse class which may be used are those listed in the Colour Index as Disperse Red 54, 72, 74, 159 and 167, Disperse Orange 30, Disperse Yellow 42, Disperse Blue 73, 83 and 219, Disperse Brown 4, Disperse Violet 33 and Solvent Red 52.

A surprising and very advantageous result of a colouration process according to this invention is that even although the dyestuff used may be soluble in both the polyolefine and polyester and is not dissolved in the polyester prior to admixture with the polyolefine, in the resulting shaped coloured article substantially all the dyestuff accumulates in the polyester which is distributed in particles throughout the predominating olefine polymer. In the case of filaments and other shaped articles which after shaping are longitudinally oriented at a temperature at which the article is solid the included particles of polyester carrying substantially all of the dyestuff will be elongated into fibrils and surprisingly a uniform and apparently solid colour is produced. By reason of the class of dyestuffs used in this invention the resulting coloured shaped articles may be produced in a much wider range of bright colours than hitherto with an associated improvement in colour fastness compared with the colours produced by conventional dyeing of polyolefine articles shaped from a mixture of the olefine polymer with a minor proportion of for example a polyester additive polymer.

Thus, according to another aspect of this invention we provide a coloured shaped article of an olefine polymer containing a minor proportion of a polyester as a multiplicity of small particles or fibrils distributed throughout the article, wherein the colouring matter is soluble in the polyester and is carried substantially wholly within and throughout only the polyester particles or fibrils.

Mixing of a polyolefine with a polyester and a dyestuff according to this invention may be carried out in several ways and it is preferred to carry out at least part of the mixing in the shaping apparatus. Thus, for example a uniform solid solution of the dyestuff in the polyester may first be prepared by dissolving the colour in the molten polyester which after solidification is reduced to chips or pellets preferably of uniform size. The coloured pellets are then metered at a carefully controlled rate into and mixed with a stream of polyolefine passing through a shaping apparatus, as for example a screw extruder and spinneret if filaments are being produced. Alternatively pellets of dyestuff and pellets of polyester each of uniform weight may be metered separately into the polyolefine stream in the shaping apparatus. Another alternative is to make compound pellets of the polyester and the dyestuff and to meter these into the polyolefine stream. A further alternative is to compound the polymers into pellets into a stream of which in the shaping machine pellets of dyestuff are metered. The dye or polyester additives may be metered into the polyolefine stream either before or after it has been rendered molten in the shaping apparatus.

The quantities of dyestuff and polyester used in this invention will depend primarily upon the depth of colour required and the nature of the polyester chosen. In any case the total amount of adjuvants is preferably kept low so that the properties of the polyolefine article are not interfered with. For most purposes less than 20%, preferably 5 – 10% of the polyester (expressed as % by weight of the polyolefine) is sufficient and depending upon the solubility of the dyestuff in the polyester 0.01 – 2% by weight of dyestuff is sufficient and will yield light to intense colouration of the polyolefine. For the highest fastness properties, particularly to rubbing and washing it is preferred not to exceed the amount of dyestuff which the amount of polyester chosen can retain in solution. To achieve this it may be necessary to carry out a few trails at different concentrations of dyestuff and polyester followed by fastness tests to determine the optimum concentrations for the desired shade.

As has been stated herein the temperature of shaping exceeds the melting temperatures of the polyester and polyolefine and it is preferred that, at least for the formation of coloured filaments, the shaping-temperature should exceed the melting temperature of the higher melting polymer (usually the polyester) by at least 20° C. in order that a distribution of fine fibrils should be formed in the filaments particularly when the shaped or spun filaments are subsequently oriented or drawn.

By means of this invention shaped articles of olefine polymers may be produced in a wider range of bright attractive colours in light to full, deep shades more cheaply and satisfactorily than by previous methods. In particular a considerable cost benefit is obtained by use of the present invention compared with the addition to a polyolefine of a mordant polymer followed by dyeing of an article shaped from the mixture with a disperse dyestuff. In addition to this cost benefit a wider range of colours may be obtained, some of which are simply not available as disperse dyestuffs suitable for conventional dyeing, as well as deeper colourations of a polyolefine article. A further advantage of the present invention is that it is not necessary to prepare a mixture or concentrate of dyestuff and polymer which is to be added to the polyolefine during shaping since the invention is equally effective if dyestuff and polyester are simply added in controlled amounts to the polyolefine and mixed therewith in the shaping process. One advantage of this flexibility of method of colouration is that the amounts of polyester and dyestuff may be independently regulated according to requirements. Furthermore, the added polyester does not require to be finely divided but may for example be metered in as uniform sized pellets. The additional difficulty and cost of coating or encapsulating a finely divided dyestuff or pigment with for example polyethylene as has hitherto been done to produce an easily handled or used colouring material, is obviated by means of this invention, the dyestuff for which requires no such special preparation.

The invention is illustrated by the following Examples wherein percentages given are by weight of the polyolefine and fastness tests on the coloured filaments produced by melt spinning are carried out according to the standard methods as described in the Society of Dyers and Colourists "Standard Methods for the Determination of the Colour Fastness of Textiles", 3rd Edition 1962 and Supplement of 1966.

EXAMPLES 1-2

Isotactic polypropylene of melt flow index 11 (as measured by the ASTM method D 1238-52T at 190° C using a 10 Kg weight on the ram) is melted in a screw extruder maintained at 280° – 285° C and the melt is passed at the rate of 13.6 Kg per hour through a spinneret having 100 orifices of 0.76 mm diameter at a temperature of 265° C, the extruded filaments are wound up in a package at a speed of 568 m/min and measure 10 decitex per filament. Poly-(ethylene terephthalate) chips of 0.74 intrinsic viscosity (measured at 25° C in solution in o-chlorophenol) containing 0.04% by weight of titanium dioxide delustrant and metered at the rate of 1.36 Kg per hour into the polypropylene melt in the screw extruder and is mixed therewith before extrusion. Likewise dyestuff is metered in the form of pellets into and mixed with the polypropylene melt before extrusion at a rate corresponding to the % dyestuff (based on the weight of the polypropylene) shown in the following table wherein fastness values for the filaments after drawing at a draw ratio of 3.7:1 are also given. The addition of 0.5% dye thus gives a weight ratio of 1:20 of dye to poly(ethylene terephthalate).

| Example | Dye Name | Colour Index Ref. | Dye % | ISO 3 Wash | | | Shampoo | Rubbing | | Light |
|---|---|---|---|---|---|---|---|---|---|---|
| | | | | P | T | N* | | Dry | Wet | |
| 1 | Waxoline Rubine | Solvent Red 52 | 0.5 | 5 | 4-5 | 4-5 | 5 | 4-5 | 4 | 4-5 |
| 2 | Foron Scarlet | Disperse Red 54 | 0.5 | 5 | 5 | 4-5 | 5 | 5 | 5 | 4 |

-continued

| Example | Dye Name | Colour Index Ref. | Dye % | Fastness Rating |||||||
|---|---|---|---|---|---|---|---|---|---|---|
| | | | | ISO 3 Wash ||| | Rubbing || |
| | | | | P | T | N* | Shampoo | Dry | Wet | Light |
| | 3GFL | | | | | | | | | |

*P represents the rating for the pattern alone; T and N for the pattern washed with a piece of polyester (T) or nylon fabric.

Microscopic examination of the coloured filaments showed that all the colour is present in the fine uniformly distributed fibrils of polyester distributed throughout the filaments.

COMPARATIVE EXAMPLES A, B AND C

For comparison polypropylene filaments are prepared as in the foregoing Examples (A) and (B) omitting the polyester addition and (C) omitting the dyestuff and subsequently dyeing the drawn filaments containing 10% of polyester in a conventional dyebath containing 2.5% on the weight of the filaments of the dyestuffs Foron Scarlet 3GFL. The dyebath is not exhausted in the dyeing operation which produces approximately the same shade filaments as in Example 2. The following table illustrates the poor fastness ratings obtained by these comparative colouration methods which represent methods hitherto suggested or used. A numerical difference in rating of one unit represents a two-fold change in fastness.

| Comparative | Dye Name | Dye % | Fastness Rating |||||||
|---|---|---|---|---|---|---|---|---|---|
| | | | ISO 3 Wash ||| | Rubbing || |
| | | | P | T | N | Shampoo | Dry | Wet | Light |
| A | Waxoline Rubine | 0.5 | 5 | 5 | 3–4 | 5 | 3–4 | 3 | 2–3 |
| B | Foron Scarlet 3GFL | 0.5 | 5 | 4–5 | 4 | 5 | 4 | 3–4 | 2 |
| C | Foron Scarlet 3GFL | — | 5 | 5 | 4–5 | 4–5 | 5 | 5 | 3 |

EXAMPLES 3–4

Linear polyethylene granules and granules of a copolymer of ethylene terephthalate with 30 moles % of ethylene adipate are fed to a screw extruder at rates which produce a mixed melt comprising 90 parts by weight of polyolefine and 10 parts by weight of polyester. The melt is used to extrusion coat a band of continuous polyethylene terephthalate filaments at a shaping temperature (at the die) of 190° C and an extrusion rate of 36.3 Kg/hr. Uniform pellets of the pure dyestuff Dispersol Yellow D-7G are metered at the rate of 0.11 Kg/hr (i.e. a weight ratio of dyestuff to polyester of 1:33) into the extruder melt and mixed therewith. The fastness of the colouration of the extrusion coating is given in the following table (Example 3) wherein the values are given for a similar extrusion coated band produced at the same extrusion rate for both mixed polymer and dyestuff pellets at a shaping temperature of 170° C the dyestuff being Foron Rubine S-2GFL (Example 4).

| Example | Dye Name | Colour Index Ref | Fastness Rating |||
|---|---|---|---|---|---|
| | | | Light | Wet Rubbing* | Blooming** |
| 3 | Dispersol Yellow D-7G | Disperse Yellow 126 | 5 | 4–5 | Negligible |
| 4 | Foron Rubine S-2GFL | Disperse Red 167 | 4–5 | 4–5 | Negligible |

*Measured 24 hours after preparation of the band.
**Assessed after 6 months storage at room temperature.

COMPARATIVE EXAMPLES D AND E

Extrusion coated bands are produced as in Examples 3 and 4 only omitting the polyester component conditions being otherwise the same for each dyestuff. The fastness results measured or assessed after storage as in the foregoing Examples 3 – 4 are shown below.

In the absence of the polyester both light and rubbing fastness is greatly reduced and blooming, that is dye lost from the surface of the bands by exudation and sublimation merely on storage six months at room temperature, is excessive.

| Example | Dye Name | Fastness Rating || Blooming** |
|---|---|---|---|---|
| | | Light | Wet Rubbing* | |
| D | Dispersion Yellow D-7G | 3 | 3 | EXCESSIVE |
| E | Foron Rubine S - 2GFL | 3 | 2 | EXCESSIVE |

*Measured 24 hours after preparation of the band.
**Assessed after 6 months storage at room temperature.

As evidenced from Examples 1 to 4, the weight ratio of colouring matter to polyester is at least 1:20 and ranges to 1:33.

What is claimed is:

1. A coloured shaped article of a polymer of an unsaturated hydrocarbon or an unsaturated halogenated hydrocarbon containing from 5 to 20% of a polyester by weight of said hydrocarbon polymer as a multiplicity of small particles or fibrils distributed throughout the article, wherein colouring matter in an amount of from 0.01 to 2% by weight of said olefine polymer is present and is soluble in the polyester and is carried substantially wholly within and throughout only the polyester particles or filbrils and the weight ratio of colouring matter to polyester is at least 1:20.

2. An article according to claim 1 wherein the hydrocarbon polymer is linear polyethylene, polyvinyl chloride or stereoregular polypropylene or poly-4-methylpentene-1.

3. An article according to claim 1 wherein the polyester is poly(ethylene-terephthalate) or a copolyester of ethylene terephthalate with a minor proportion of an ester of another diol or dibasic acid.

4. An article according to claim 1 wherein the article is a textile filament or filamentary yarn.

5. An article according to claim 1 wherein the colouring matter is a disperse dyestuff.

6. An article according to claim 1 wherein said ratio is in the range of 1:20 to 1:33.

7. A process for the production of a coloured shaped article from a polymer of an unsaturated hydrocarbon or an unsaturated halogenated hydrocarbon, wherein from 5 to 20% of a polyester by weight of said hydrocarbon polymer and from 0.01 to 2% by weight of said hydrocarbon polymer of a dyestuff soluble therein the weight ratio of colouring matter to polyester being at least 1:20 are separately or together mixed with or incorporated into the hydrocarbon polymer prior to shaping, and said hydrocarbon polymer is shaped.

8. A process according to claim 7 wherein shaping is effected by melt spinning the hydrocarbon polymer into filaments.

9. A process according to claim 8 wherein shaping is effected in apparatus including a screw extruder.

10. A process according to claim 7 wherein the hydrocarbon polymer is linear polyethylene, polyvinylchloride or stereoregular polypropylene or poly(4-methylpentene-1).

11. A process according to claim 7 wherein the polyester is poly(ethylene terephthalate) or a copolyester of ethylene terephthalate with a minor proportion of an ester of another diol or dibasic acid.

12. A process according to claim 7 wherein the shaping temperature is at last 20° C above the melting temperature of the higher melting polymer in the mixture.

13. A process according to clalim 7 wherein said ratio is in the range 1:20 to 1:33.

14. A process according to claim 7 wherein the hydrocarbon polymer is applied to a substrate material by extrusion coating.

15. An article according to claim 1 wherein the hydrocarbon polymer is an olefine or vinyl polymer.

16. A process according to claim 7 wherein the hydrocarbon polymer is an olefine or vinyl polymer.

* * * * *